UNITED STATES PATENT OFFICE.

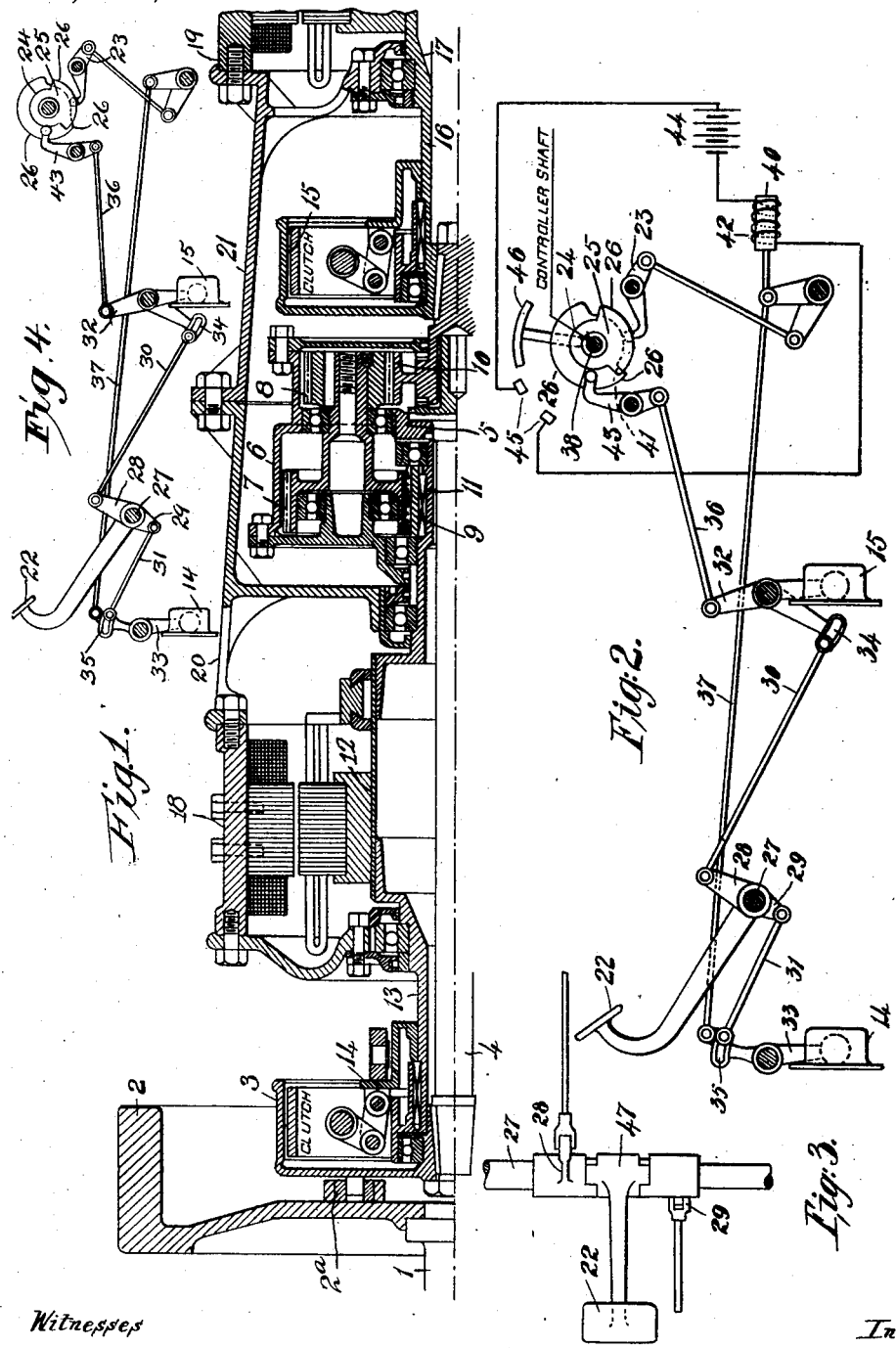

JOHN GODFREY PARRY THOMAS, OF CHISWICK, LONDON, ENGLAND, ASSIGNOR TO THOMAS FOREIGN PATENTS LIMITED, OF LONDON, ENGLAND, A CORPORATION OF GREAT BRITAIN.

ELECTRIC POWER TRANSMISSION.

1,217,529.  Specification of Letters Patent.  Patented Feb. 27, 1917.

Application filed June 26, 1913. Serial No. 775,949.

*To all whom it may concern:*

Be it known that I, JOHN GODFREY PARRY THOMAS, a subject of the King of Great Britain, residing at 21 Ennismore avenue, Chiswick, in the county of London, England, have invented new and useful Improvements in Electric Power Transmission, of which the following is a specification.

This invention relates to electromechanical power transmission systems in which a prime motor is joined through a balance or epicyclic gear to two dynamo electric machines one of which is upon the driven shaft. It is especially concerned with an improved mechanical disposition of such machines which facilitates their mounting, for instance in a vehicle, and obviates many serious difficulties in alining the separate shafts. The new arrangement also enables the clutches requisite for the operation of the system to be disposed in a more advantageous manner. The invention further relates to means for interconnecting those clutches with the electrical control apparatus so that the clutches may be controlled by a single clutch pedal or lever but come into engagement only when the electrical conditions of the machine are appropriate to such engagement.

In the accompanying drawings—

Figure 1 shows in half cross sectional elevation a construction embodying the invention, while Fig. 2 illustrates diagrammatically the interconnection of the clutches of Fig. 1 with the electrical control mechanism.

Fig. 3 is a plan of an alternative construction of a part of Fig. 2.

Fig. 4 illustrates a modification of the arrangement shown in Fig. 2.

In the drawings, 1 is the shaft driven by a prime motor (not shown) and this carries a fly wheel 2 of ordinary form. A flexible coupling of any suitable type shown conventionally at 2ª connects this fly wheel with the drum 3 upon a shaft 4 which at its other end is connected with the central web 5 of a casing 6 in which are supported pairs of planet pinions 7, 8. These mesh respectively with sun pinions 9, 10 the former of which is keyed upon a sleeve 11 surrounding the shaft 4 and carrying at 12 the armature of a dynamo electric machine. The further end of the armature rests upon a sleeve 13 also surrounding the shaft 4 and having keyed to it one member of an expanding or other friction clutch 14 which when in action joins the sleeve to the drum 3 keyed upon the shaft 4, thereby rendering the epicyclic gear 7, 8, 9, 10 inoperative. The sun wheel 10 is keyed to the outer member 15 of a similar friction clutch, the inner member of which is upon a shaft 16 which carries at 17 the armature of a second dynamo electric machine, and which is joined directly, or in the case of vehicles through a universal coupling, to the load shaft.

The whole of this structure from the flexible coupling between the fly wheel 2 and drum 3 to the universal coupling between the shaft 17 and the road wheels is supported in a frame built up from the casings of the electrical machines. These casings 18 and 19 have end plates supporting bearings for the respective shafts with which they make oil-tight joints. The casing 18 is extended at 20 to partially inclose the epicyclic gearing and is rigidly joined by a bolted-on tubular section 21 to the casing 19. This combined casing is very readily suspended in a vehicle frame by suitable saddles.

By means of electrical connections between the machines 12 and 17 and control apparatus therefor, not illustrated in the drawings but now well known, this mechanism can be employed to transmit from the substantially constant speed shaft 1 a variable speed drive to the load shaft 16.

The clutch 14 requires to be in action only when the vehicle is running on top speed, when by locking the gear it renders the power transmission purely mechanical; or when the engine is being started by the aid of the electrical machine 12; or, finally, when the vehicle is being driven backward by the aid of the machine 12 driven as a generator and actuating the machine 17 purely electrically as a motor. The clutch 15 on the other hand, requires to be in action at all times except when it is desired to run the engine free or in starting or reversing. These clutches are conveniently disengaged or held out of action by the use of a foot pedal 22, as illustrated diagrammatically in Fig. 2. The pedal rotates a shaft 27 to which are attached cranks 28 and 29 joined by rods 30 and 31 respectively to levers 32, 33 by which the respective clutches 15 and 14 are moved. But the connection between the rods 30 and 31 and the levers 32 and 33 is not rigid. In the construction of Fig. 2 the ends of the levers 32 and 33 are slotted as at 34, 35 and the slots receive pins on the ends of the respective levers 30 and 31. This makes it possible for either clutch to remain disengaged when the other is allowed to engage. In order that the clutches may not be allowed to reëngage under the action of their own springs at inappropriate moments, they are suitably interconnected with the electrical controller so as to be held out independently of the pedal 22 when they should not be engaged. In the diagram illustrated in Fig. 2 each clutch operating lever 32, 33 is joined through links 36, 37 to a bell crank lever 43, 23 pivoted adjacent to the disks 24, 25 which are fast on the shaft 38 of the electrical controller. These disks are provided with cam projections 26 which are in position to engage with the respective levers 43, 23 upon rotation of the controller and when so engaged prevent the respective clutches coming into operation.

It is not necessary that the mere rotation of the controller should bring the clutches out of action though the cam co-acting with lever 23 is shown at 39 (in Fig. 2) as adapted to permit this. It is preferable to have the top speed clutch disengaged by a solenoid or other electrical operating device which is brought into action by suitable contacts on the controller; this greatly lessens the muscular effort required for the operation of the controller. Such apparatus is indicated in dotted lines in Fig. 4. 40 indicates the core of a solenoid which is joined to the rod 37 so that when attracted through the excitation of the solenoid the clutch 14 will be operated and the lever 23 lifted so as to permit the passage of its cam 26 beneath it. In this case the cam may have a radial instead of a sloping edge as indicated at 41. The winding 42 of the solenoid is connected with a suitable battery 44 and with contacts 45 in the controller, which are bridged at the proper instant by a contact member 46 on the controller shaft.

This interconnection of the clutches with the controller enables the vehicle to be readily driven backward by putting the controller in the reverse position and locking the gear for as long as is necessary by means of the clutch 14. In actual operation having once put the controller in the reverse position the driver will move the vehicle backward and stop it as he desires by putting the clutch in or out.

It will be obvious that mechanical equivalents may replace the pin-and-slot connections which permit independent motion of the clutches. For instance as shown in Fig. 3 the clutch pedal 22 may have a notched boss 47 loosely rotatable on the shaft 27 and each of the cranks 28, 29 may have a similar notched boss adapted to engage with boss 47 as shown. Thus depression of the pedal will cause the rotation of both cranks, whereas when the pedal is released the cranks need not follow it. It will be understood that if the construction of Fig. 3 is adopted the pin-and-slot connections 34, 35 will be dispensed with and a simple pin connection substituted.

What I claim is:

1. In an electric power transmission system the combination with two dynamo electric machines of means rigidly connecting their stationary parts, a driving shaft co-axial with and passing through the shaft of one of said machines, pairs of planet pinions of different size carried by said driving shaft, sun wheels of different size intermeshing with said planet wheels and connected with respective dynamo shafts, and a clutch adapted to join said driving shaft with the dynamo shaft carrying the small sun wheel.

2. In an electromechanical power transmission system, the combination with two dynamo electric machines of means rigidly connecting their stationary members so as to form a rigid casing, bearings in said casing supporting the shaft of said machines co-axially, a driving shaft contained within one of said shafts, pairs of planet pinions carried by said driving shaft intermediate said machines, a sun pinion on one dynamo shaft meshing with one set of planet pinions, a sun pinion meshing with the other set of planet pinions, a fourth stub shaft carrying said latter sun pinion, a clutch member upon said stub shaft and a co-action clutch member upon the remaining dynamo shaft also intermediate said dynamos.

3. In an electromechanical power transmission system the combination with two dynamo electric machines of a rigid casing formed from their stationary members supporting their shafts co-axially, a driving shaft, a balance gear adapted to interconnect said driving shaft with said dynamos, a clutch for rendering said balance gear inoperative, a clutch for separating one of said dynamo shafts from said gearing, and a clutch operating member adapted to hold both of said clutches out of engagement.

4. In an electromechanical power transmission system the combination with two dynamo electric machines of a driving shaft, a balance gear interconnecting said shaft with the shafts of said dynamos, a clutch rendering said balance gear inoperative, a second clutch for separating one of said dynamo shafts from said gear, a single clutch operating member adapted to hold both of said clutches out of operation, a controller for said dynamo electric machines, and means on said controller for preventing each of said clutches coming into operation in particular positions of the controller.

5. In an electromechanical power transmission system the combination with two dynamo electric machines of a driving shaft, a balance gear interconnecting said shaft with the shafts of said dynamos, a clutch rendering said balance gear inoperative, a second clutch for separating one of said dynamo shafts from said gear, a single clutch operating member adapted to hold both of said clutches out of operation, a controller for said dynamo electric machines, means on said controller for preventing each of said clutches coming into operation in particular positions of the controller, and further means on said controller for operating electrically the clutch which renders the balance gear inoperative.

In testimony whereof I have signed my name to this specification in the presence of two subscribing witnesses.

JOHN GODFREY PARRY THOMAS.

Witnesses:
A. E. O'DELL,
LEONARD E. HAEFNER.

Copies of this patent may be obtained for five cents each, by addressing the "Commissioner of Patents, Washington, D. C."